United States Patent
Chu et al.

(10) Patent No.: US 9,554,324 B2
(45) Date of Patent: Jan. 24, 2017

(54) FAST INITIAL LINK SETUP (FILS) FRAME CONTENT FOR A WIRELESS NETWORK

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 288 days.

(21) Appl. No.: 14/051,583

(22) Filed: Oct. 11, 2013

(65) Prior Publication Data

US 2014/0105131 A1  Apr. 17, 2014

Related U.S. Application Data

(60) Provisional application No. 61/714,507, filed on Oct. 16, 2012.

(51) Int. Cl.
*H04W 40/24* (2009.01)
*H04W 48/16* (2009.01)
(Continued)

(52) U.S. Cl.
CPC ............ *H04W 48/16* (2013.01); *H04W 8/005* (2013.01); *H04W 40/244* (2013.01); *H04W 40/246* (2013.01); *H04W 48/12* (2013.01)

(58) Field of Classification Search
CPC ... H04W 8/005; H04W 40/244; H04W 40/246
See application file for complete search history.

(56) References Cited

U.S. PATENT DOCUMENTS

2007/0032219 A1* 2/2007 Rudolf et al. ............. 455/404.1
2007/0140163 A1* 6/2007 Meier et al. ................. 370/329
(Continued)

OTHER PUBLICATIONS

IEEE Std 802.11n-2009, Telecommunications and Information exchange between systems—Local and metropolitan area networks—Specific requirements; Part 11: Wireless LAN Medium Access Control [MAC] and Physical Layer [PHY] Specifications; Amendment 5: Enhancements for Higher Throughput, Oct. 29, 2009, 536 pages.*

*Primary Examiner* — Hoon J Chung
(74) *Attorney, Agent, or Firm* — Gardere Wynne Sewell, LLP (57) ABSTRACT

A wireless network access point generates a fast initial link setup (FILS) discovery frame for broadcast to one or more wireless stations. The wireless network access point supports many operating channels including a primary channel. The FILS discovery frame includes a data field populated with an identification of a channel number for that primary channel of the wireless network access point. The FILS discovery frame includes another data field populated with a primary channel operating class identification. The broadcast FILS discovery frame further includes data indicating whether indicating whether multiple BSSIDs are supported. An FD capability field of the FILS discovery frame includes sub-fields indicating one or more of operation channel width, PHY type of the wireless access point, number of spatial streams supported by the wireless access point and multiple BSSIDs support provided by the wireless access point.

16 Claims, 4 Drawing Sheets

(51) Int. Cl.
*H04W 8/00* (2009.01)
*H04W 48/12* (2009.01)

(56) References Cited

U.S. PATENT DOCUMENTS

| | | | |
|---|---|---|---|
| 2008/0137627 A1* | 6/2008 | Fischer et al. | 370/338 |
| 2012/0120892 A1* | 5/2012 | Freda et al. | 370/329 |
| 2013/0177002 A1 | 7/2013 | Sun et al. | |
| 2013/0179943 A1 | 7/2013 | Sun et al. | |
| 2013/0279438 A1* | 10/2013 | Kwon | H04W 72/0406 370/329 |
| 2015/0181507 A1* | 6/2015 | Park | H04W 48/16 370/311 |
| 2015/0334751 A1* | 11/2015 | Alanen | H04W 48/16 370/329 |

* cited by examiner

| B0 | B1 | B2 | B3 | B4 | B5 | B6 | B7 | B8 | B9 | B10 | B11 | B15 |
|---|---|---|---|---|---|---|---|---|---|---|---|---|
| OPERATION CHANNEL WIDTH | | PHY TYPE | | Nss (NUMBER OF SPATIAL STREAMS) | | | MULTIPLE BSSID SUPPORT | PRIVACY | IPv4 SUPPORT | IPv6 SUPPORT | RESERVED | |
| 00:20MHz | | 00:11b | | 000:1 | | | | | | | | |
| 01:40MHz | | 01:11a/11g | | 001:2 | | | | | | | | |
| 10:80MHz | | 10:11n | | 010:3 | | | | | | | | |
| 11:160MHz | | 11:11ac | | 011:4 | | | | | | | | |
| | | | | 100:5 | | | | | | | | |
| | | | | 101:6 | | | | | | | | |
| | | | | 110:7 | | | | | | | | |
| | | | | 111:8 | | | | | | | | |

FIG. 3B

| B0 | B1 | B2 | B3 | B4 | B5 | B6 | B7 | B8 | B9 | B15 |
|---|---|---|---|---|---|---|---|---|---|---|
| OPERATION CHANNEL WIDTH | | Nss (NUMBER OF SPATIAL STREAMS) | | | MULTIPLE BSSID SUPPORT | PRIVACY | IPv4 SUPPORT | IPv6 SUPPORT | RESERVED | |
| 00:20MHz | | 000:1 | | | | | | | | |
| 01:40MHz | | 001:2 | | | | | | | | |
| 10:80MHz | | 010:3 | | | | | | | | |
| 11:160MHz | | 011:4 | | | | | | | | |
| | | 100:5 | | | | | | | | |
| | | 101:6 | | | | | | | | |
| | | 110:7 | | | | | | | | |
| | | 111:8 | | | | | | | | |

| B0 | B1 B2 | | B3 B4 | B5 | B6 | B7 | B8 | B9 B15 |
|---|---|---|---|---|---|---|---|---|
| PHY TYPE | Nss (NUMBER OF SPATIAL STREAMS) | | MULTIPLE BSSID SUPPORT | | PRIVACY | IPv4 SUPPORT | IPv6 SUPPORT | RESERVED |
| 00:11b | 000:1 | | | | | | | |
| 01:11a/11g | 001:2 | | | | | | | |
| 10:11n | 010:3 | | | | | | | |
| 11:11ac | 011:4 | | | | | | | |
| | 100:5 | | | | | | | |
| | 101:6 | | | | | | | |
| | 110:7 | | | | | | | |
| | 111:8 | | | | | | | |

FIG. 3C

FAST INITIAL LINK SETUP (FILS) FRAME CONTENT FOR A WIRELESS NETWORK

PRIORITY CLAIM

This application claims the benefit of U.S. Provisional Application for Patent No. 61/714,507 filed Oct. 16, 2012, the disclosure of which is incorporated by reference.

TECHNICAL FIELD

This invention relates generally to wireless networks, and more particularly to systems and methods for access point (AP) discovery in a wireless network (for example, and without limitation, a wireless network conforming to the IEEE 802.11ai wireless network specification) using a fast initial link setup (FILS) beacon.

BACKGROUND

In a wireless local area network (WLAN), a mechanism must exist for enabling a wireless station (STA) to discover a wireless access point (AP).

In one known technique, a wireless station waits to receive a beacon transmission originated by an access point. Such a beacon may be transmitted by the access point on a periodic basis, such as once every 100 ms. This technique is referred to in the art as passive scanning. The wireless station may respond to the beacon by making connection with the access point.

In another known technique, the wireless station sends a probe request out into the network and then waits to receive a response from an access point that detects that probe request. This technique is referred to in the art as active scanning. The wireless station may then respond to the probe request response by making connection with the responding access point.

As general rule, discovery of the access point by the wireless station is accomplished more quickly with active scanning than with passive scanning. There are, however, concerns with the use of the active scanning technique. One problem with active scanning is that the probe request is transmitted by the wireless station in a broadcast mode, and this may prompt multiple probe request responses from multiple listening access points. Access may be delayed as the wireless station must decide on making a connection between several responding access points. In the situation where a plurality of wireless stations need to associate with a single access point, the transmission of probe requests by each one of the multiple wireless stations may flood the network and adversely delay achieving discovery of and connection to the access point. Further, active scanning consumes more power than passive scanning, which may not be suitable for wireless stations (such as mobile devices) where battery consumption is of critical concern.

To better support the passive scanning mode, it is known in the art to have the access points send beacons more frequently. This solution, however, has the drawback that the more frequently transmitted access point beacon communications will occupy substantial air time. Furthermore, it is understood that in the situation where a plurality of wireless stations need to associate with a single access point, the time spent by those wireless stations in passively waiting for a beacon transmission from the access point leads to inefficient wireless network operation.

To address the foregoing and other concerns, the IEEE 802.11ai standard proposes the use of a fast initial link setup (FILS) discovery beacon broadcast by access points for enabling access point discovery by wireless stations. The FILS discovery beacon may be a frame or packet. The terms FILS discovery beacon and FILS discovery frame are used herein interchangeably. Wireless stations discover an access point by detecting a FILS discovery beacon transmitted repeatedly from the access point at shorter or faster subsequent time intervals (e.g., higher frequency) than a typical beacon, which is typically transmitted at a period of 100 ms or other frequency according to IEEE 802.11 standards. The FILS discovery beacon may be transmitted with the standard or typical beacon. However, the FILS discovery beacon has a modified format that comprises less information than a typical beacon format. The reduced size of the FILS discovery beacon in comparison to a typical or regular transmitted beacon avoids the problem identified above concerning the occupation of substantial air time by the beacon broadcasts. The faster transmission time interval and the smaller size format of the FILS discovery beacon are implemented to speed up the access point discovery process. The goal is to achieve a FILS total association time requirement (beacon detection and association between the access point and a wireless station) of about 100 ms.

It is also known in the art to transmit the FILS discovery beacon with a randomized broadcast pattern (for example, according to a predefined sequence of transmission and non-transmission phases). The randomized broadcast pattern improves the chances for faster detection of the FILS discovery beacon and avoids a broadcast collision in the case of multiple access points operating in passive mode.

Alternatively, the FILS discovery beacon is transmitted with a periodic broadcast pattern at a relatively higher frequency than with standard beacons and without using any predefined sequence of transmission and non-transmission phases.

Reference is made to United States Patent Application Publication 2013/0177002, the disclosure of which is incorporated by reference, for a discussion of the FILS process.

Those skilled in the art recognize, despite the advantages of the FILS discovery beacon, that the FILS discovery beacon does not harmonize very well with IEEE 802.11ac. Multiple basic service set identification (BSSID) support is not present and 802.11ac capability information is not provided. There is accordingly a need in the art for an improved FILS discovery beacon in support of detection and association between an access point and a wireless station in a wireless communication network.

SUMMARY

In an embodiment, a method comprises: generating by a wireless network access point of a fast initial link setup (FILS) discovery frame, said wireless network access point supporting a plurality of channels including a primary channel, said FILS discovery frame including a data field populated with an identification of a channel number for said primary channel of the wireless network access point that generated said FILS discovery frame.

In an embodiment, a method comprises: receiving by a wireless station of a fast initial link setup (FILS) discovery frame broadcast by a wireless network access point supporting a plurality of channels including a primary channel, said FILS discovery frame including a data field populated with an identification of a channel number for said primary channel of the broadcasting wireless network access point.

In an embodiment, a method comprises: generating by a wireless network access point of a fast initial link setup (FILS) discovery frame, said FILS discovery frame including an FD capability field, and wherein said FD capability field includes a sub-field populated with data indicative of one or more of the following information: wireless access point support of multiple basic service set identifications (BSSIDs); number of spatial streams supported by the wireless access point; a PHY type of the wireless access point and an operation channel width of channels supported by the wireless access point.

In an embodiment, a method comprises: receiving by a wireless station of a fast initial link setup (FILS) discovery frame broadcast by a wireless network access point, said FILS discovery frame including an FD capability field, and wherein said FD capability field includes a sub-field populated with data indicative of one or more of the following information: wireless access point support of multiple basic service set identifications (BSSIDs); number of spatial streams supported by the wireless access point; a PHY type of the wireless access point and an operation channel width of channels supported by the wireless access point.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF THE DRAWINGS

Figure 1:
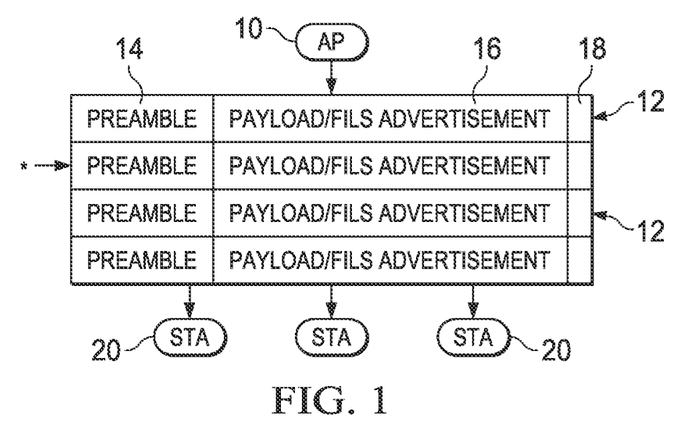
FIG. 1 illustrates the broadcast by an access point of duplicate fast initial link setup (FILS) discovery frames.

The IEEE 802.11ai specification permits an access point (AP) 10 to broadcast duplicate fast initial link setup (FILS) discovery frames 12 as shown in FIG. 1 towards wireless stations (STAs) 20. Each frame 12 includes a preamble 14 and a payload/FILS advertisement 16. The typical contents of the preamble and advertisement are well known in the art. The duplicated FILS discovery frame transmissions are made, for example, on different channels. One of those channels, for example, the channel indicated by the "*", is configured to be the primary channel for the access point 10. It is further understood that the primary channel, and indeed all channels supported by a given access point 10, have an operating bandwidth. It is important for the wireless stations STAs 20 that receive the FILS discovery frame 12 to know whether the received frame was transmitted on the primary channel of the broadcasting access point 10 (more specifically, it is important for the wireless stations to know what is the primary channel of the access point). It is also important for the wireless stations 20 that receive the FILS discovery frame 12 to know, regardless of primary channel identification, the operating bandwidth supported by the channel.

The payload/FILS advertisement 16 of the FILS discovery frame 12 accordingly includes data 18 providing information concerning the primary channel of the access point 10. For example, the data 18 may include a primary channel field to indicate the primary channel of the BSS (for example, specifying the 20 MHz primary channel). This primary channel field may include a first sub-field specifying an operating class and a second sub-field specifying a channel number, wherein the specified channel number is the primary channel identification for the access point 10 broadcasting the FILS discovery frame 12.

The data 18 may further include a primary channel indication sub-field which provides an indication to the wireless stations 20 as to whether the FILS discovery frame 12 includes the above-mentioned primary channel field (and thus indicating whether the FILS discovery frame is providing wireless stations with information concerning operating class and primary channel number). This primary channel indication sub-field is an optional field and need not be included (for example, when the FILS discovery frame is not transmitted in a non-high throughput (HT) duplicate PLCP protocol data unit (PPDU), the primary channel indication is not required).

With respect to the wireless stations 20, upon receipt of one of the duplicated FILS discovery frames 12, the wireless station can identify the primary channel of the access point 10, identify that the frame 12 has been received on a secondary channel (i.e., a channel not matching the primary channel identification) and switch operation over to the primary channel for the purpose of receiving the beacon at the Target Beacon Transmission Time (TBTT).

In accordance with IEEE 802.11v, those skilled in the art understand that an access point 10 may support multiple basic service set identifications (BSSIDs). Only one access point, the transmitted access point identified by the transmitted basic service set identification, broadcasts beacons including the FILS discovery frame 12. When a wireless station 20 receives a beacon with multiple basic service set identifications (BSSIDs) information element (IE), the wireless station can determine the non-transmitted BSSID and the profile of the non-transmitted access point. Other access points in the access point device define the operation of their respective networks through the non-transmitted profiles and the management information of the transmitted access point. The wireless station 20 can then associate with a non-transmitted access point.

In response to receipt of the FILS discovery frame 12, the wireless station can decide that the WLAN identification (SSID) contained in the payload/FILS advertisement 16 of the frame 12 is not desired. In response thereto, the wireless station 20 can immediately move to sense another channel. However, it is preferable that the wireless station be able to identify networks for the non-transmitted BSSIDs. Otherwise, the wireless station may miss the opportunity to connect to a more desirable BSS.

The data 18 within the payload/FILS advertisement 16 of the FILS discovery frame 12 accordingly provides information concerning whether the broadcasting access point supports multiple basic service set identifications (BSSIDs). As an example, the data 18 may further include a multiple BSSID sub-field indicating access point support of multiple BSS. As another example, an existing bit (or bits) of the payload/FILS advertisement 16, for example, one or more bits of the included FILS discovery (FD) Capability field, may be used to provide the multiple BSSID indication.

Figure 2:
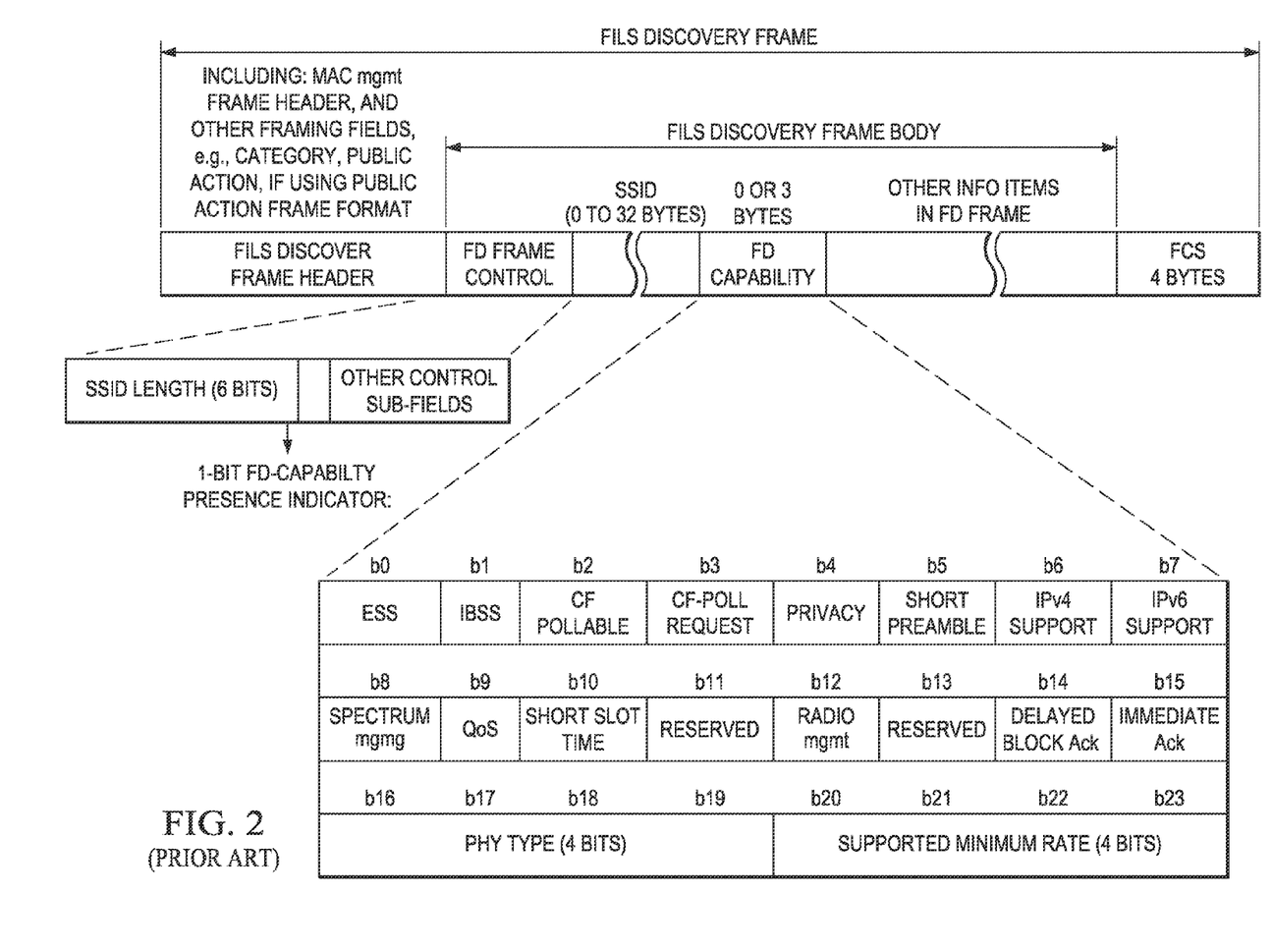
FIG. 2 illustrates a conventional configuration for the FILS discovery frame.

Reference is now made to FIG. 2 which shows a conventional configuration for the FILS discovery frame and included FD Capability field. The FD frame control field includes data indicating whether the FILS discovery frame includes an FD Capability Field (comprising a field occupying up to three bytes of data). In comparison to FIG. 1, the FILS discovery frame header would generally correspond to the MAC header after the preamble and the FILS discovery frame body would generally correspond to the payload/FILS advertisement. It is noted, however, as discussed above, that additional or substitute data 18 is provided in the payload/FILS advertisement to better support the FILS operation.

The following observations are made with respect to the contents of the FD Capability field in FIG. 2: a) the FD Capability field is for network selection and not for BSS operation, but many bits within the FD Capability field are for BSS operation; the 802.11 PHY Type includes many old type which should not be included in the FD Capability; and the Supported Minimum Rate field is not helpful in making BSS selection.

Embodiments of the present disclosure propose modifying the FD Capability field to include some of the data 18 discussed above and further to, respectively: a) remove BSS operation related bits from the FD Capability field (such as sub-fields relating to BSS except for the Privacy subfield); provide bits for use in identifying the network type (.11b, .11a/g, .11n, .11ac, etc.) or provide bits to identify the BSS capability (20 MHz, 40 MHz, 80 MHz, 160 MHz/80 MHz+80 MHz, etc.) or provide bits identifying both; and c) provide information on the maximum data rate of the network or a combination of information concerning channel bandwidth, number of spatial streams, modulation and coding rate (of which channel bandwidth and number of spatial streams are relatively speaking more important pieces of information). Generally speaking, an embodiment of the present disclosure proposes the addition of 802.11ac specific information to the FD Capability field of the FILS discovery frame.

Figure 3A:
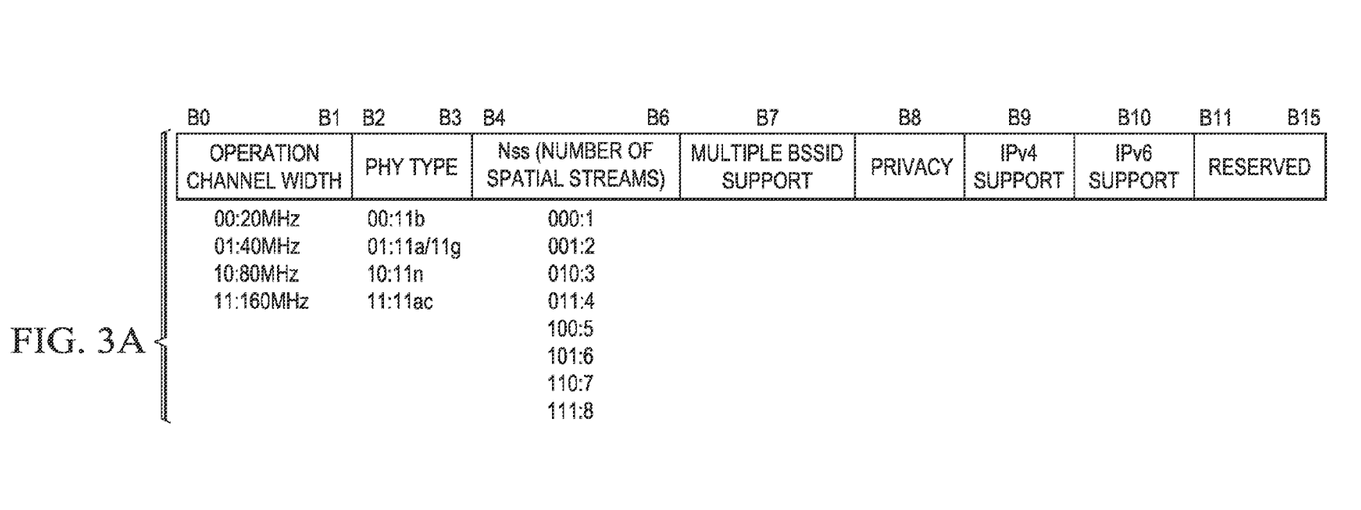
FIGS. 3A-3C illustrate embodiments of modified FD Capability fields for use in the payload/FILS advertisement of a FILS discovery frame.

Reference is now made to FIG. 3A which illustrates an embodiment of a modified FD Capability field for use in the payload/FILS advertisement 16 of the FILS discovery frame 12. The modified FD Capability field includes a first sub-field specifying an operation channel bandwidth. With two bits reserved for the operation channel bandwidth, four distinct bandwidth specifications can be made (in this instance specifying operation at one of 20 MHz, 40 MHZ, 80 MHz or 160 MHz/80 MHz+80 MHz). The modified FD Capability field includes a second sub-field specifying a PHY type. With two bits reserved for the PHY type, four distinct PHY type specifications can be made (in this instance specifying .11b, .11a/g, .11n or .11ac). The modified FD Capability field includes a third sub-field specifying the number of spatial streams. With three bits reserved for the number of spatial streams, eight distinct numbers of spatial streams can be specified. The modified FD Capability field also includes a fourth sub-field specifying whether the access point supports multiple basic service set identifications (BSSIDs). This is a single bit field indicating yes or no as to support. The modified FD Capability field still further includes a fifth sub-field specifying privacy. This is a single bit field identical to bit b4 of FIG. 2 identifying yes or no as to privacy. The modified FD Capability field further includes a sixth sub-field specifying the Ipv4 support. This is a single bit field identical to bit b6 of FIG. 2 identifying yes or no as to Ipv4 support. The modified FD Capability field also includes a seventh sub-field specifying the Ipv6 support. This is a single bit field identical to bit b7 of FIG. 2 identifying yes or no as to Ipv6 support. The remaining bits b11 to b15 of the modified FD Capability field are reserved for other uses. It will further be understood that the modified FD Capability field may further include a third byte (bits b16-b23) as shown in FIG. 2.

Figure 3B:
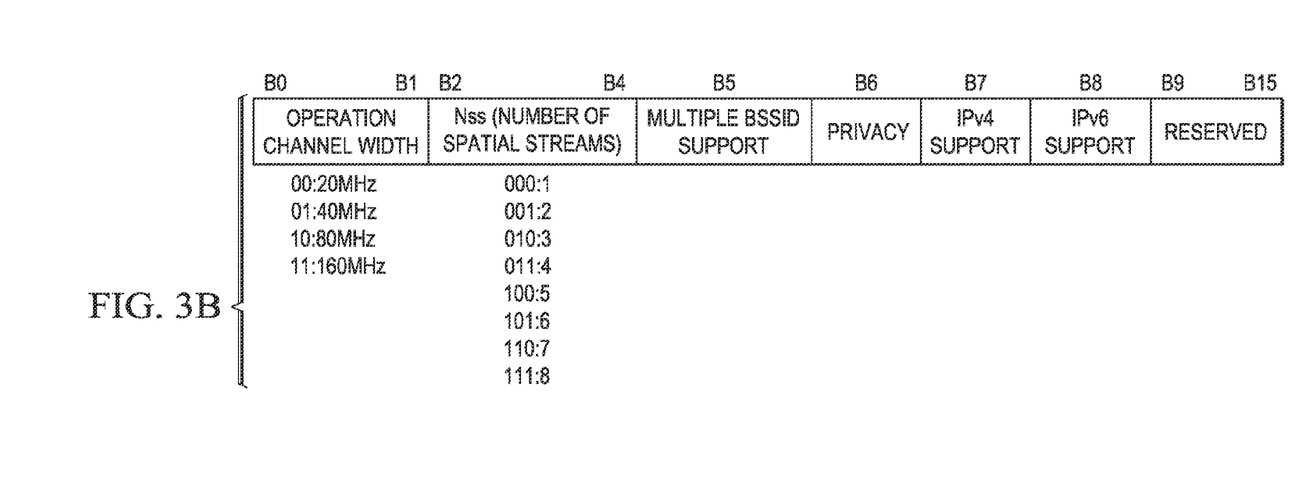

Reference is now made to FIG. 3B which illustrates an embodiment of a modified FD Capability field for use in the payload/FILS advertisement 16 of the FILS discovery frame 12. The modified FD Capability field includes a first sub-field specifying an operation channel bandwidth. With two bits reserved for the operation channel bandwidth, four distinct bandwidth specifications can be made (in this instance specifying operation at one of 20 MHz, 40 MHZ, 80 MHz or 160 MHz/80 MHz+80 MHz). The modified FD Capability field includes a second sub-field specifying the number of spatial streams. With three bits reserved for the number of spatial streams, eight distinct numbers of spatial streams can be specified. The modified FD Capability field includes a third sub-field specifying whether the access point supports multiple basic service set identifications (BSSIDs). This is a single bit field indicating yes or no as to support. The modified FD Capability field also includes a fourth sub-field specifying privacy. This is a single bit field identical to bit b4 of FIG. 2 identifying yes or no as to privacy. The modified FD Capability field still further includes a fifth sub-field specifying the Ipv4 support. This is a single bit field identical to bit b6 of FIG. 2 identifying yes or no as to Ipv4 support. The modified FD Capability field further includes a sixth sub-field specifying the Ipv6 support. This is a single bit field identical to bit b7 of FIG. 2 identifying yes or no as to Ipv6 support. The remaining bits b9 to b15 of the modified FD Capability field are reserved for other uses. It will further be understood that the modified FD Capability field may further include a third byte (bits b16-b23) as shown in FIG. 2.

Figure 3C:
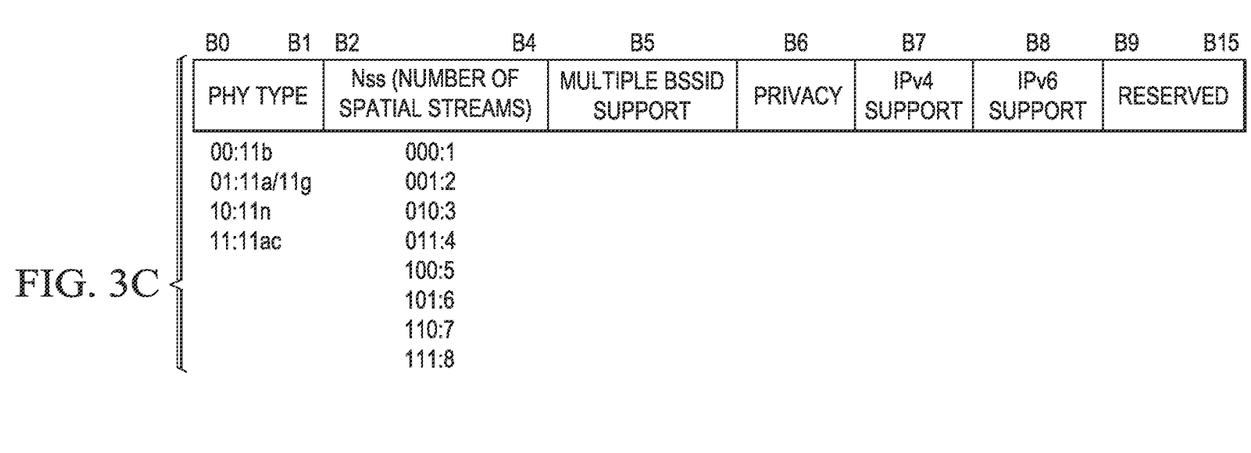

Reference is now made to FIG. 3C which illustrates an embodiment of a modified FD Capability field for use in the payload/FILS advertisement 16 of the FILS discovery frame 12. The modified FD Capability field includes a first sub-field specifying a PHY type. With two bits reserved for the PHY type, four distinct PHY type specifications can be made (in this instance specifying .11b, .11a/g, .11n or .11ac). The modified FD Capability field includes a second sub-field specifying the number of spatial streams. With three bits reserved for the number of spatial streams, eight distinct numbers of spatial streams can be specified. The modified FD Capability field also includes a third sub-field specifying whether the access point supports multiple basic service set identifications (BSSIDs). This is a single bit field indicating yes or no as to support. The modified FD Capability field still further includes a fourth sub-field specifying privacy. This is a single bit field identical to bit b4 of FIG. 2 identifying yes or no as to privacy. The modified FD Capability field further includes a fifth sub-field specifying the Ipv4 support. This is a single bit field identical to bit b6 of FIG. 2 identifying yes or no as to Ipv4 support. The modified FD Capability field also includes a sixth sub-field specifying the Ipv6 support. This is a single bit field identical to bit b7 of FIG. 2 identifying yes or no as to Ipv6 support. The remaining bits b9 to b15 of the modified FD Capability field are reserved for other uses. It will further be understood that the modified FD Capability field may further include a third byte (bits b16-b23) as shown in FIG. 2.

The access points discussed herein include any device configured to allow the wireless stations access to one or more communications networks and/or service provider networks, e.g., the Internet, a WLAN, a cellular network, other networks, or combinations thereof. The access points comprise wireless or radio transmitters/receivers that communicate with the wireless stations, for example, according to the 802.11ai standard or other 802.11 standards (for Wi-Fi). For example, the access points include wireless routers and/or modems, such as 802.11 modems/routers. The wireless stations include any mobile or personal communication devices configured to exchange data wirelessly with one or more networks via the access points. The wireless stations also comprise wireless or radio transmitters/receivers that communicate with the access points, for example, based on the 802.11ai standard other 802.11 standards (for Wi-Fi). For example, the wireless stations include laptop computers, tablet computers, and/or smartphones.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A method, comprising:
using a wireless network access point supporting a plurality of channels including a primary channel to transmit duplicate fast initial link setup (FILS) discovery frames for a first transmission duration on at least one of a primary channel and a non-primary channel, wherein each FILS discovery frame includes a data field populated with an identification of a channel number for said primary channel of the wireless network access point;
receiving one of the FILS discovery frames at a wireless station receiving on an operating channel, identifying whether the operating channel is the non-primary channel, and if the operating channel is the non-primary channel switching the operating channel to the primary channel such that the wireless station is receiving on the primary channel;
wherein the primary channel comprises a channel different from the non-primary channel at which the wireless station receives a beacon at a Target Beacon Transmission Time (TBTT), the beacon being different from the FILS discovery frame and having a second transmission duration greater than the first transmission duration.

2. The method of claim 1, wherein each FILS discovery frame further includes another data field populated with an operating class identification for said primary channel.

3. The method of claim 1, wherein each FILS discovery frame further includes a data bit indicating whether the FILS discovery frame provides primary channel number information.

4. The method of claim 1, wherein said access point supports multiple basic service set identifications (BSSIDs), each FILS discovery frame further including a data bit indicating that multiple BSSIDs are supported by the wireless network access point that generated said FILS discovery frame.

5. The method of claim 4, wherein each FILS discovery frame includes an FD capability field, and wherein said data bit indicating multiple BSSIDs support is a data bit within the FD capability field.

6. The method of claim 1, wherein each FILS discovery frame includes an FD capability field, and wherein said FD capability field includes a sub-field populated with data indicating an operation channel width of the channels supported by the wireless access point.

7. The method of claim 1, wherein each FILS discovery frame includes an FD capability field, and wherein said FD capability field includes a sub-field populated with data indicating a PHY type of the wireless access point.

8. The method of claim 1, wherein each FILS discovery frame includes an FD capability field, and wherein said FD capability field includes a sub-field populated with data indicating a number of spatial streams supported by the wireless access point.

9. A method, comprising:
using a wireless station operating on an operating channel to receive one of a plurality of duplicate fast initial link setup (FILS) discovery frames broadcast for a first transmission duration by a wireless network access point on at least one of a primary channel and a non-primary channel, wherein each FILS discovery frame includes a data field populated with an identification of a channel number for said primary channel of the broadcasting wireless network access point;
identifying whether the operating channel is the non-primary channel, and if the operating channel is the non-primary channel, switching the wireless station to the primary channel to receive a beacon at a Target Beacon Transmission Time (TBTT), the beacon being different from the FILS discovery frame and having a second transmission duration greater than the first transmission duration.

10. The method of claim 9, wherein each FILS discovery frame further includes another data field populated with an operating class identification for said primary channel.

11. The method of claim 9, wherein each FILS discovery frame further includes a data bit indicating whether the FILS discovery frame provides primary channel number information.

12. The method of claim 9, wherein said access point supports multiple basic service set identifications (BSSIDs), each FILS discovery frame further including a data bit indicating that multiple BSSIDs are supported by the wireless network access point that generated said FILS discovery frame.

13. The method of claim 12, wherein each FILS discovery frame includes an FD capability field, and wherein said data bit indicating multiple BSSIDs support is a data bit within the FD capability field.

14. The method of claim 9, wherein each FILS discovery frame includes an FD capability field, and wherein said FD capability field includes a sub-field populated with data indicating an operation channel width of the channels supported by the wireless access point.

15. The method of claim 9, wherein each FILS discovery frame includes an FD capability field, and wherein said FD capability field includes a sub-field populated with data indicating a PHY type of the wireless access point.

16. The method of claim 9, wherein each FILS discovery frame includes an FD capability field, and wherein said FD capability field includes a sub-field populated with data indicating a number of spatial streams supported by the wireless access point.

\* \* \* \* \*